US012724857B2

(12) United States Patent
Garreau

(10) Patent No.: US 12,724,857 B2
(45) Date of Patent: Sep. 1, 2026

(54) METHOD TO SECURE A JAVA SOFTWARE CODE

(71) Applicant: THALES DIS FRANCE SAS, Meudon (FR)

(72) Inventor: Eric Garreau, La Farlede (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 19/136,332

(22) PCT Filed: Dec. 5, 2023

(86) PCT No.: PCT/EP2023/084401

§ 371 (c)(1), (2) Date: Jun. 6, 2025

(87) PCT Pub. No.: WO2024/121178

PCT Pub. Date: Jun. 13, 2024

(65) Prior Publication Data

US 2026/0010617 A1 Jan. 8, 2026

(30) Foreign Application Priority Data

Dec. 7, 2022 (EP) .................................... 22306811

(51) Int. Cl.
*G06F 21/14* (2013.01)

(52) U.S. Cl.
CPC ........ *G06F 21/14* (2013.01); *G06F 2221/033* (2013.01); *G06F 2221/2123* (2013.01); *G06F 2221/2125* (2013.01)

(58) Field of Classification Search
CPC ............... G06F 21/14; G06F 2221/033; G06F 2221/2123; G06F 2221/2125
See application file for complete search history.

(56) References Cited

U.S. PATENT DOCUMENTS 9,064,099 B2 * 6/2015 Horning .................. G06F 21/14
2012/0246487 A1 * 9/2012 Gu ......................... G06F 21/14 713/190

(Continued)

FOREIGN PATENT DOCUMENTS

CN 107038354 A 8/2017

OTHER PUBLICATIONS

Zhang Yueqian et al: "DexHunter: Toward Extracting Hidden Code from Packed Android Applications" Nov. 18, 2015 (Nov. 18, 2015), SAT 2015 18th International Conference, Austin, TX, USA, Sep. 24-27, 2015; [Lecture Notes in Computer Science; Lect.Notes Computer], Springer, Berlin, Heidelberg, pp. 293-311, XP047330895, ISBN: 978-3-540-74549-5 [retrieved on Nov. 18, 2015] p. 3, paragraph 2.1 Obfucation.

(Continued)

*Primary Examiner* — David J Pearson

(57) ABSTRACT

Method of securing a java software code to be run by a Java Virtual Machine including at least one call to a native method of a native language library, to the Java Virtual Machine, native methods of the native language library, and generating a secure native language library, the method performed by a processor having steps including defining in the native language library a method which when executed at runtime, when the native language library is loaded by the Java Virtual Machine, is configured for registering useless native methods of the native language library, and inserting in the native language library calls to a plurality of constructors, one of them being configured to trigger a thread, which is configured for unregistering said useless native methods and registering said at least one native method of the native language library to be called by the java software code.

6 Claims, 3 Drawing Sheets

(56) References Cited

U.S. PATENT DOCUMENTS

| | | | | |
|---|---|---|---|---|
| 2015/0154407 | A1* | 6/2015 | Yi | G06F 21/14 713/194 |
| 2019/0068640 | A1* | 2/2019 | Araujo | G06F 21/53 |

OTHER PUBLICATIONS

International Search Report (PCT/ISA/210) and Written Opinion (PCT/ISA/237) mailed on Feb. 14, 2024, by the European Patent Office as the International Searching Authority for current International Application No. PCT/EP2023/084401—13 pages.

* cited by examiner

METHOD TO SECURE A JAVA SOFTWARE CODE

FIELD OF USE

The present invention relates to the field of software protection, and more particularly of techniques for protecting a java application against code static and dynamic analysis.

BACKGROUND

Today, many services are provided to users by running software applications. Such applications may run on various devices, mobile or not, such as desktop computers, laptops, point of sale terminals, smartphones, etc. They may run locally or be implemented across a network like a LAN or the Internet. Some devices such as smart cards or bank credit cards may even be dedicated to running one or a few applications. Such applications are usually run in unsecured environments where an attacker may gain some control, or even full control, of the operation of the system running the application. Consequently, most of these applications need to implement some security mechanisms in order to protect data handled by the application from being read or modified by such an attacker.

An attacker may try to understand the operation of a software by performing a static analysis of the compiled code executed by the system. Reverse engineering of a compiled code may be used to retrieve the corresponding source code of a software. In addition, he may also use a debugger to perform some dynamic analysis of the code, which enables to read the content of the system's memory while executing the code. As a result of both analysis, the attacker can gain knowledge of sensitive information handled by the software.

Java compiled code is particularly sensitive to such analysis since java compiled code must remain executable by a standard Java virtual machine, which prevents the implementation of strong countermeasures, such as a strong obfuscation, in the compiled code. A solution to this weakness of java code is to port critical parts of a java software to a native language such as C. The software part ported in a native language may be compiled as a separate library, which can benefit from stronger countermeasures available for a native language, such as an obfuscation more resistant to analysis. Native functions of such a library may then be called from the remaining java code.

However, the interface between java code and a native library is also a weak point since all entry points of the native library must be made visible to the java code, and thus attackers can perform various classes of attacks on these visible entry points, such as Man-In-The-Middle attack or symbolic execution.

In order to hide function entry points of a native library it is possible and recommended to set into such a native library a unique JNI_OnLoad entry point registering the internal entry points of the functions of the library without exposing them. Nevertheless, tools now exist which reveal the functions of the library, such as RegisterNatives, further called by JNI_OnLoad to register the internal entry points of library, which makes the protection of the entry points by JNI_OnLoad inefficient.

Consequently, there is a need for a method for protecting a java code and an associated native library against attacks designed to reveal the entry points of the native library despite the existence in the library of a single JNI_OnLoad entry point.

SUMMARY

For this purpose and according to a first aspect, this invention therefore relates to a method of securing a java software code to be run by a Java Virtual Machine comprising at least one call to a native method of a native language library, using a unique entry point, called JNI_OnLoad entry point as an interface between the java software code and the native language library and configured to register, to the Java Virtual Machine, native methods of the native language library, said method generating a secure native language library and comprising performed by a processor:

- defining in the native language library a method, called JNI_OnLoad method, which when executed at runtime, when the native language library is loaded by the Java Virtual Machine, is configured for registering useless native methods of the native language library,
- inserting in the native language library calls to a plurality of constructors, one of them being configured to trigger a thread, called zJNI thread, which is configured for, when executed at runtime, unregistering said useless native methods and registering said at least one native method of the native language library to be called by the java software code.

By doing so, the native methods called by the java code are properly registered but they remain hidden to an attacker tracing the calls performed by the JNI_OnLoad method.

Said useless native methods may be configured to execute an endless processing.

By doing so, following with either an emulation tool or a symbolic execution tool any of these useless methods would lead to an endless processing and would prevent an attacker from gaining any knowledge about the native methods truly called by the java code.

Said zJNI thread may be configured to wait until said useless native methods have been registered before unregistering them.

It enables the zJNI thread to be the last to register native methods of the library, in order to prevent any conflict with the registering performed by the JNI_OnLoad method.

Said calls to a plurality of constructors may be performed in a random order.

It enables to hide from the attacker which thread is the one triggering the execution of the zJNI thread.

Said plurality of constructors may be configured to perform a set of defensive features.

According to a second aspect, this invention relates to a securing device configured for securing a java software code comprising at least one call to a native method of a native language library comprising at least one native method, and comprising a processor, a memory and an input-output interface configured for performing the steps of the method according to the first aspect.

According to a third aspect, this invention relates to a method of executing, by a Java Virtual Machine run by a second processor, a java software code configured to call at least one native method of a secure native language library obtained by performing the method according to the first aspect, said secure native language library:

- defining a method, called JNI_OnLoad method, which when executed at runtime, when the native language library is loaded by the Java Virtual Machine, registers useless native methods of the native language library, and comprising a plurality of constructors, which, when executed at runtime, triggers a thread, called zJNI thread, which unregisters said useless native methods and registers said at least one native method of the native language library to be called by the java software code, said method of executing comprising:

when the Java Virtual Machine needs to execute a call to said at least one native method of the secure native language library, calling a system's LoadLibrary method to load said library, triggering, by a system's library loader, the execution of a plurality of constructors of said native language library, among which said constructor triggering the zJNI thread, which attaches to the Java Virtual Machine in a private context and then waits for the JNI_OnLoad method to perform its registrations of useless methods in a default context of the Java Virtual Machine executing said call to the LoadLibrary method, calling, by the Java Virtual Machine, the JNI_OnLoad method of the native language library, which calls a RegisterNatives method to register said useless methods and then waits or enters a useless computation loop, unregistering, by the zJNI thread, said useless native methods registered by the JNI_OnLoad method, registering, by the zJNI thread, said at least one native method to be called by the secure software code, ending, by the zJNI thread, said waiting or computation loop of the JNI_OnLoad method, detaching from the Java Virtual Machine, and ending itself, returning, by the JNI_OnLoad method and resuming the Java Virtual Machine execution.

According to a fourth aspect, this invention relates to an execution device configured for executing a java software code configured to call at least one native method of a secure native language library obtained by performing the method according to the first aspect, and comprising a processor, a memory and an input-output interface configured for performing the steps of the method according to the third aspect.

According to a fifth aspect, this invention relates to a computer program product directly loadable into the memory of at least one computer, comprising software code instructions for performing the steps of the method according to the first aspect or the second aspect when said product is run on the computer.

According to a sixth aspect, this invention relates to a non-transitory machine-readable storage medium encoded with instructions of a java software code for execution by a processor, wherein: said java software code comprises at least one call to a native method of a secure native language library which is a modified version of a native language library, obtained by performing the method according to the first aspect.

Such methods, computer program products, securing device, execution device and non-transitory machine-readable storage medium according to the second, third, fourth, fifth and sixth aspect show the same advantages as the ones of the method according to the first aspect.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
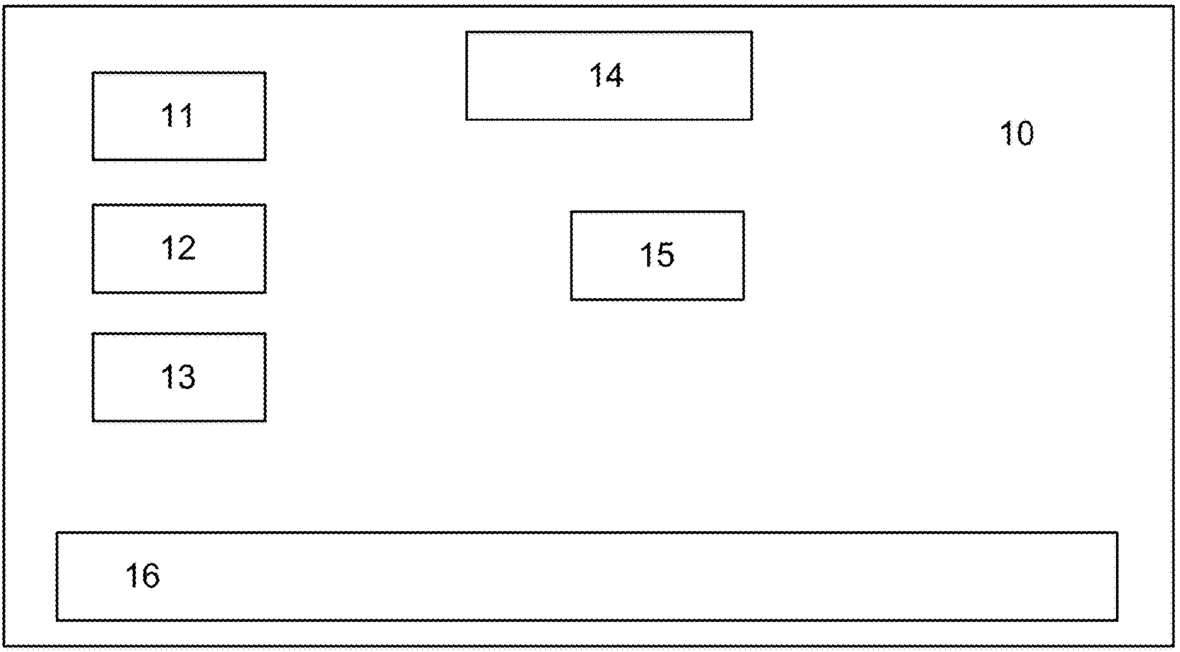
FIG. 1 illustrates schematically a securing device according to an embodiment of the present invention.

The invention aims at securing a java software code comprising a call to a native language library, by making it difficult for an attacker to understand what functions are offered by this library, what are their inputs and outputs, which are called by the java software code etc.

In the rest of this description, the expression "java code" may be used as a short version of "java software code".

Since java code security is intrinsically weak and its potential obfuscation strength is limited due to runtime constraints of the language. Native languages such as C or C++ may achieve a much higher level of security against attackers by being efficiently obfuscated. Therefore, such a native language library may be used to store a sensitive part of a java software code. As an example, such sensitive parts may perform cryptographic operations with a secret key or handle sensitive data such as a bank account number or biometric data.

The native language library comprises at least one method, hereafter called "native method". The compiled library binary may be efficiently obfuscated in order to hide the sensitive methods it provides to the java software code.

The java software code comprises at least one call to one of the native methods of the native language library.

In order to make an entry point of the library visible from the java code, so that it enables to call the methods embedded in the library, without directly exposing all these methods, the native language library may use a recommended unique entry point, called JNI_OnLoad entry point, as an interface between the java software code and the native language library. At runtime, when the Java Virtual Machine (JVM) executing the java code needs to call native methods from a native language library, the java code must at first call the System.LoadLibrary method, which uses the system dynamic loader and makes available to the java code all visible functions compatible with the JNI naming convention, or calls the JNI_OnLoad method when present in the native language library. When present, the JNI_OnLoad function must register all hidden native methods of the native language library to the java side, otherwise execution will fail at runtime when the java code calls an undefined native function. Such a registration is performed by calling the RegisterNatives method of the native language library. Such a registration enables the JVM to know the address of the native methods as defined in the native language library, and their arguments, in order to be able to call them properly from the Java context.

A problem is that such a way of interfacing a java code and a native language library, using JNI interface, is well known to attackers, which have developed tools, like jnitrace, revealing all JNI calls made by JNI_OnLoad and thus making details, including the address of all native methods, visible when the RegisterNatives calls are made.

A first aspect of the invention is a method for securing such a java software code before its execution by a Java Virtual Machine (JVM). Such a securing method is performed by a securing device 10 treating the java code and the native language library and producing a secure native language library. The java code can then be securely executed, using the secure native language library, by an execution device 20 running the JVM.

Such a securing device 10 may be any electronic device including a processor. For example it may be a personal computer PC on which a development environment has been installed. FIG. 1 describes an exemplary embodiment of such a securing device comprising a first processor 11, a first RAM memory 12, a first communication unit 13 such as an Ethernet or Wifi network adapter, a first display 14, first mass storage means 15 such as a hard drive, and first user input/output means 16. The java code and the library to be secured may be stored on the first mass storage means 15 of the securing device. The secure native language library, obtained after the securing device 10 applies the method according to the first aspect to the java software code and the native language library, can also be stored on the first mass storage 15.

Figures 2, 3:
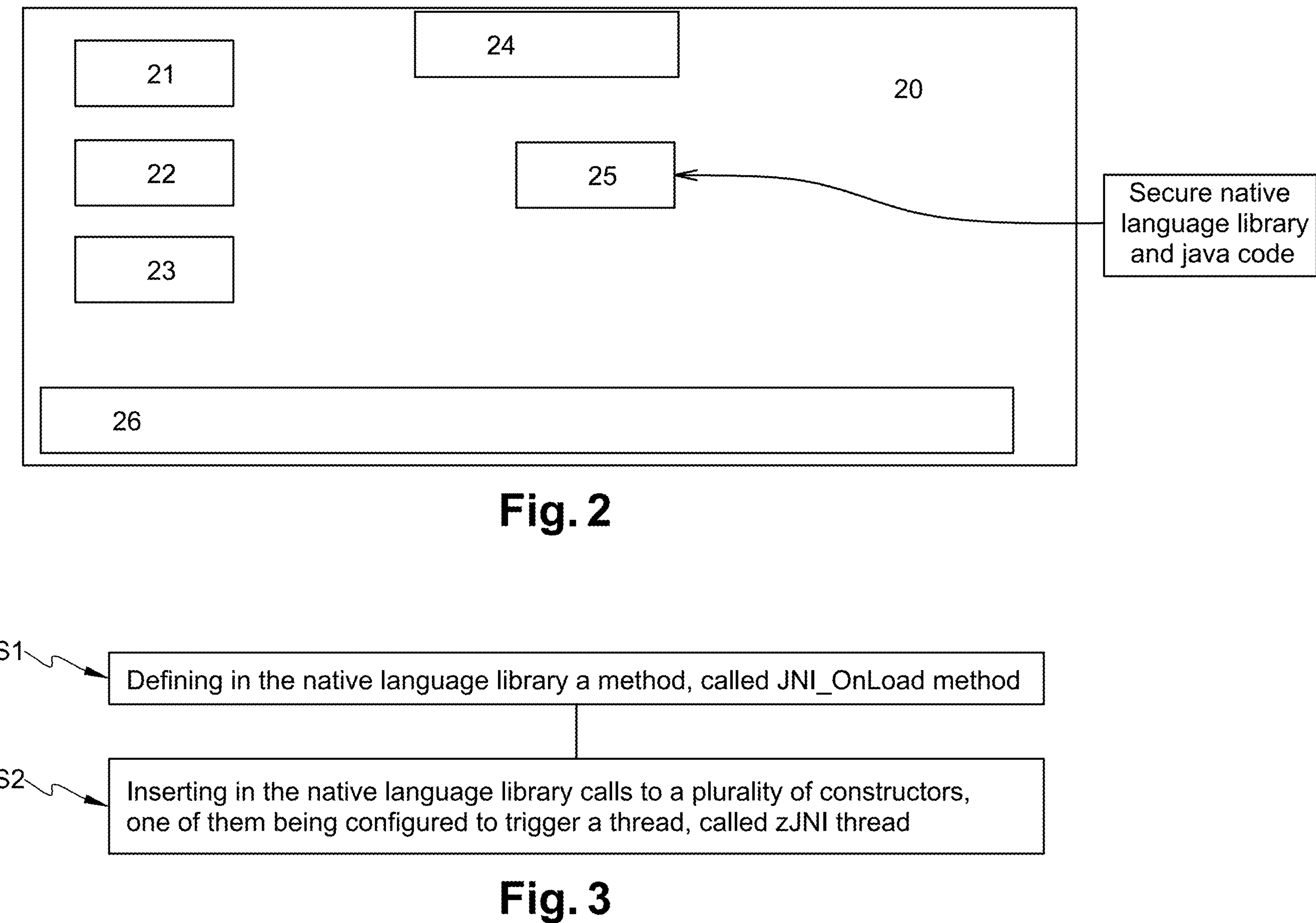
FIG. 2 illustrates schematically an execution device according to an embodiment of the present invention.
FIG. 3 illustrates schematically a method of securing a java software code according to an embodiment of the present invention.

FIG. 2 describes an exemplary embodiment of the execution device 20. For example, it may be a personal computer PC, a mobile device such as a smartphone or a tablet, or a public terminal in a bank or a point of sale. It may also be a simple chip included in a smart card or a credit card. It may comprise a second processor 21, a second RAM memory 22, a second communication unit 23 such as an Ethernet or Wifi network adapter, a second display 24, second mass storage means 25 such as a hard drive, and second user input/output means 26. The java code to be executed by the second processor 21 of the execution device 20, and the secure native language library, may be stored on the second mass storage means 25 of the executing device. The electronic device 20 may be of any type similar or different from the one of the execution device. Both devices may share the same hardware architecture, such as x86 or ARM, or have different architectures.

In order to enable the JVM to call native methods from the native language library without exposing them, not even through the calls of the JNI_OnLoad method, a first idea of the method according to the invention is to make the JNI_OnLoad method register useless methods, which are not the real ones called by the java code at runtime. Such useless methods may for example be methods performing an endless calculation, or methods designed to make an analysis tool of an attacker crash, or methods returning dummy results. In any case, they have no interest to the java code calling methods from the native language library are only designed to deceive an attacker. By doing so, an attacker tracking the calls made by the JNI_OnLoad method, particularly the call to the RegisterNatives method, will expose methods which are not the ones performing sensitive operations for the java code.

In order to nevertheless enable the java code to call methods of the native language library, a second idea of the method according to the invention is to trigger, at the loading of the library, the execution of a thread which waits until the JNI_OnLoad method has registered the useless methods and then unregisters these useless methods and registers instead the methods of the native language library to be called by the java code. After the real registration has been made, this thread ensures that the JNI_OnLoad method ends. By doing so, the methods of the library called by the java code are correctly registered after the JNI_OnLoad call has returned, as they would be registered by the JNI_OnLoad method, but their registration is not apparent to an attacker analyzing the JNI_OnLoad calls.

The following paragraphs describe the steps of the method according to the first aspect of the invention, securing the java software code to be run by the Java Virtual Machine and the native language library and producing the secure native language library, as depicted on FIG. 3. These securing steps are performed by the first processor 11 of the securing device 10 and are all labeled with the letter "S" followed by the number of the step.

In a first securing step S1, the first processor defines in the native language library a method, called JNI_OnLoad method, which when executed at runtime, when the native language library is loaded by the Java Virtual Machine, is configured for registering useless native methods of the native language library.

As discussed above, such useless methods are used as a decoy and do not perform any sensitive operation for the java code calling the native library. In an embodiment, these useless native methods are configured to only execute an endless processing.

In a second securing step S2, the first processor inserts in the native language library calls to a plurality of constructors. More precisely, all these constructor methods are referred to in the init array of the native language library which lists all the methods to be called by the system dynamic loader at loading of the library. One of these constructors is configured to trigger a thread, called zJNI thread, which is configured for, when executed at runtime, unregistering the useless native methods registered by the JNI_OnLoad method, and registering to the JVM the at least one native method of the native language library to be called by the java software code. In order to remain hidden to an attacker, this zJNI thread is not related to the execution context of the JNI_OnLoad method.

Such calls to a plurality of constructors may call dozens, or even hundreds of constructors. Such calls may be generated automatically at runtime and they may be performed in a random order. In addition to the constructor triggering the zJNI thread, it may include constructors setting JNI pointers, and a constructor validating the start of execution of the zJNI thread before handing over the execution to the JVM which then will call the JNI_OnLoad method.

The zJNI thread is first configured to attach to the java VM, which results in a JNIEnv context different and parallel to the future one of the call to JNI_OnLoad.

The zJNI thread is configured to then wait for the end of the official registrations made by the JNI_OnLoad call. In order to detect the end of the registration of the useless methods by JNI_OnLoad, the thread may for example perform a polling on a global variable storing a pointer to the JVM.

The zJNI thread is also configured for, as soon as the synchronization method implemented in JNI_OnLoad is detected by the zJNI thread, unregistering the useless native methods registered by the JNI_OnLoad method, by calling the UnregisterNatives method.

The zJNI thread is also configured for, after calling the UnregisterNatives method, registering the native methods to be called by the java software code, by making a new call to RegisterNatives with real information about the native methods. In addition, the real information about methods may be hidden in the library in order to not look like usual information passed to RegisterNatives, implying the execution of a pre-processing treatment aiming at providing the real information just before the call to RegisterNatives is made.

An attacker tracing the calls to RegisterNatives at the Java Virtual Machine level may see that the method is called twice but since the call made by the zJNI thread is made from a JNIEnv pointer different from the one used by the JNI_OnLoad method, a standard attack tool controlling the JNIEnv parameter and invoking JNI_OnLoad in order to trace the calls made using the provided JNIEnv will not enable to trace the second call to RegisterNatives.

In order to let the zJNI thread perform the operations described above, the JNI_OnLoad method should, after registering the useless native methods, not end but rather wait to do so until the zJNI thread has registered the native methods called by the java code. Therefore, after registering the useless native methods, the JNI_OnLoad method may for example be configured to perform a very long decryption loop of a static array which contains a secret, or any other operation which allows to wait until the zJNI thread has registered the native methods called by the java code.

The zJNI thread is configured for finally, after its call to RegisterNatives, detach from the JVM, free the allocated structures, and notify the JNI_OnLoad method to end its wait state, allowing the JNI_OnLoad call to return to the JVM. The zJNI thread may for instance trigger a semaphore or force a loop counter to a value which ends a fake decryption loop, or any condition on which the JNI_OnLoad method was waiting.

In an embodiment, the plurality of constructors called at the native language library loading are configured to perform various self-defense actions and cross-check themselves in order to detect any attachment or tracing which could be made on any of them. Such self-defense actions may for example be among the following:

- anti-debug protection: checking that the program (java code or native code) is not being run in a debugger,
- anti-tracing protection: checking that the execution is not being traced by an emulation tool like qemu,
- anti-hooking protection: checking that the sensitive methods are not hooked and that the native code is actually loaded by the genuine JVM, or detecting a hooking framework like Frida,
- anti-tampering protection: checking the integrity of the executed code by comparing it against its original signature,
- anti-emulation protection: checking that the native language library is not emulated by a processor emulation tool like qemu or Unicorn,
- anti-symbolic-execution protection: checking that the code is not being run by a symbolic execution framework like angr,
- or any other classical technique used against static or dynamic reverse engineering attacks.

In order to further improve the security level of the java code and the native language library, they are assumed to be obfuscated, using an existing obfuscation tool, in order to make the attacker also face a strong resistance against static analysis.

Secure Software Code Execution

Figure 4:
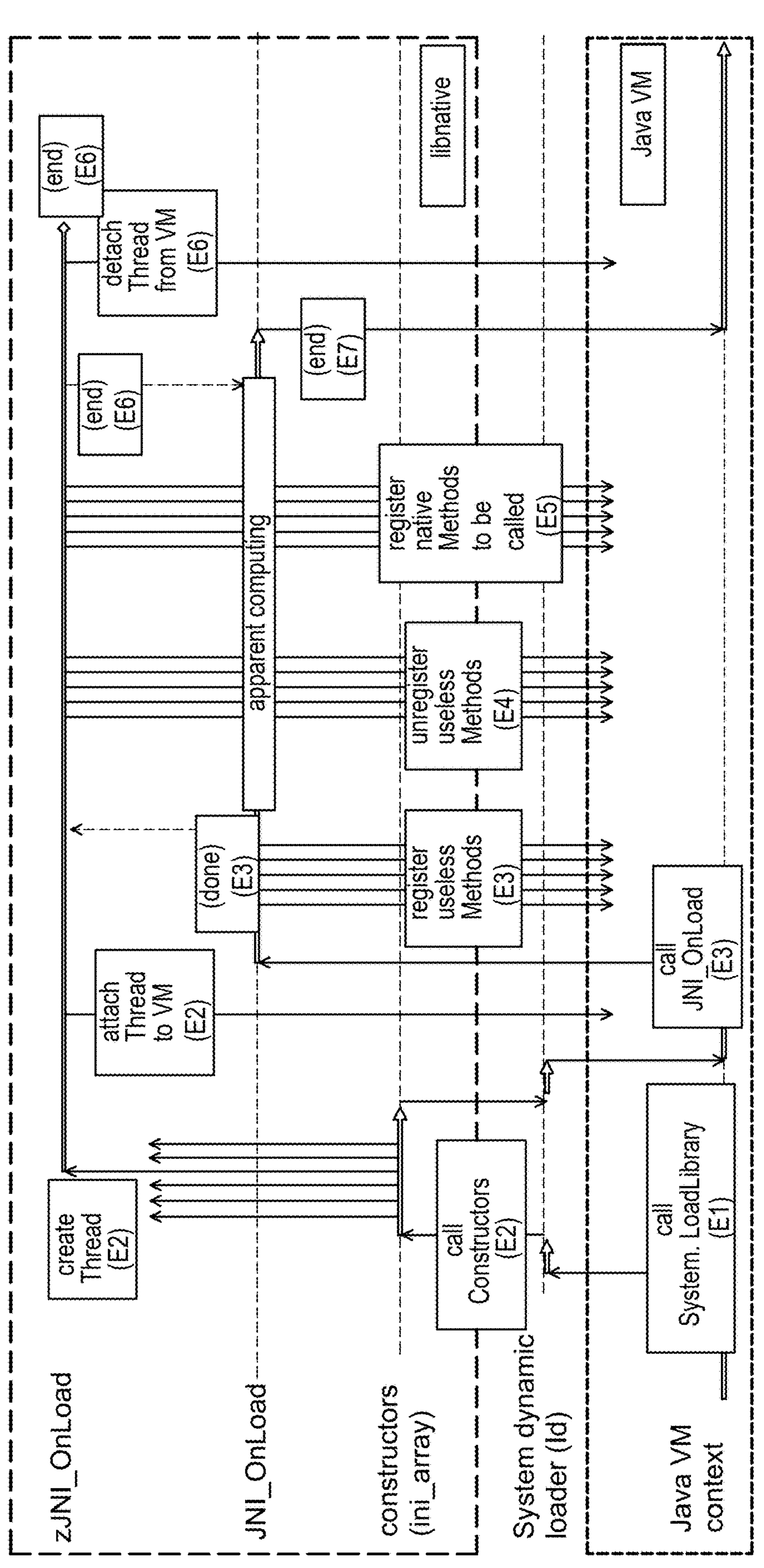
FIG. 4 illustrates schematically a method of executing a secure software code according to an embodiment of the present invention.

Reference is made to steps performed by the execution device 20 when executing the java software code with the secure native language library, obtained after the method according to the first aspect is completed. Such execution steps are labeled with the letter "E" followed by the number of the step and illustrated on FIG. 4.

After the securing steps described here above have been performed by the securing device, producing a secure native language library, the java software code, now calling the secure native language library, can be securely executed by the second processor 21 of the execution device 20:

- during a first execution step E1, the JVM executed by the second processor 21 needs to execute a call to a native method of the native language library, and it calls the system's LoadLibrary method to load the library,
- during a second execution step E2, the system's library loader triggers the execution of the plurality of constructors, among which the constructor triggering the zJNI thread, which attaches to the JVM in a private context and then waits for the JNI_OnLoad method to perform its registrations of useless methods in a default context of the Java Virtual Machine executing said call to the LoadLibrary method,
- during a third execution step E3, the JVM executed by the second processor 21 calls the JNI_OnLoad method of the native language library, which calls the RegisterNatives method to register useless methods and then waits or enters a useless computation loop,
- during a fourth execution step E4, the zJNI thread unregisters the useless native methods registered by the JNI_OnLoad method,
- during a fifth execution step E5, the zJNI thread registers the native methods to be called by the java software code,
- during a sixth execution step E6, the zJNI thread ends the waiting or the computation loop of the JNI_OnLoad method, detaches from the JVM, and ends itself,
- during a seventh execution step E7, the JNI_OnLoad method returns and the JVM execution resumes.

In a second aspect, the invention also relates to the method of executing the instructions of the java code along with the secure native language library, as executed by the second processor 21 of the executing device 20. Said secure native language library is then a modified version of the original native language library on which the method according to the first aspect described here above has been applied. The method of executing the instructions of the secure software code comprises the execution steps E1 to E7 described here above.

In a third aspect, the invention also relates to a computer program product directly loadable into the memory of at least one computer, comprising software code instructions for performing the steps of the method according to the first aspect or the second aspect when said product is run on the computer.

In a fourth aspect, the invention also relates to a non-transitory machine-readable storage medium encoded with the instructions of the java code and the secure native language library obtained after the first processor 11 of the securing device 10 has performed at least the steps S1 to S2 of the method according to the first aspect described here above. Said secure native language library is then a modified version of the original native language library on which said method according to the first aspect has been applied.

After performing such a securing of the java software code and the native language library, the code seems to have at runtime the same behavior as any other java code calling a native language library. From the java side perspective, the native language library is loaded, then the JNI_OnLoad function is called, and when it returns the normal JVM execution resumes.

But at the same time, the native methods called by the java code are hidden to any attacker and not easily revealed by tracing the calls made by the JNI_OnLoad method. Using the jnitrace attack tool would reveal a set of entry points to the attacker, but not the ones corresponding to the methods call by the java code, and the attacker must fully reverse the non-standard method based on constructors registering the methods to find the good entry points. In addition, following JNI_OnLoad with either an emulation tool or a symbolic execution tool would also reveal a wrong set of entry points, and following these wrong entry points would lead to an endless processing.

The invention claimed is:

1. A method of executing, by a Java Virtual Machine run by a second processor, a java software code configured to call at least one native method of a secure native language library, said secure native language library:

defining a method, called JNI_OnLoad method, which when executed at runtime, when the native language library is loaded by the Java Virtual Machine, registers useless native methods of the native language library, and comprising a plurality of constructors, which, when executed at runtime, triggers a thread, called zJNI thread, which unregisters said useless native methods and registers said at least one native method of the native language library to be called by the java software code, said method of executing comprising:

when the Java Virtual Machine needs to execute a call to said at least one native method of the secure native language library, calling a system's LoadLibrary method to load said library, triggering, by a system's library loader, the execution of a plurality of constructors of said native language library, among which said constructor triggering the zJNI thread, which attaches to the Java Virtual Machine in a private context and then waits for the JNI_OnLoad method to perform its registrations of useless methods in a default context of the Java Virtual Machine executing said call to the LoadLibrary method, calling, by the Java Virtual Machine, the JNI_OnLoad method of the native language library, which calls a RegisterNatives method to register said useless methods and then waits or enters a useless computation loop, unregistering, by the zJNI thread, said useless native methods registered by the JNI_OnLoad method, registering, by the zJNI thread, said at least one native method to be called by the secure software code, ending, by the zJNI thread, said waiting or computation loop of the JNI_OnLoad method, detaching from the Java Virtual Machine, and ending itself, returning, by the JNI_OnLoad method and resuming the Java Virtual Machine execution.

2. An execution device configured for executing a java software code configured to call at least one native method of a secure native language library, and comprising a processor, a memory and an input-output interface configured for performing the steps of claim 1.

3. The method of claim 1, wherein said useless native methods are configured to execute an endless processing.

4. The method of claim 1, wherein said zJNI thread is configured to wait until said useless native methods have been registered before unregistering them.

5. The method of claim 1, wherein said calls to a plurality of constructors are performed in a random order.

6. The method of claim 1, wherein said plurality of constructors are configured to perform a set of defensive features.

* * * * *